US011722716B2

United States Patent
Nandy et al.

(10) Patent No.: US 11,722,716 B2
(45) Date of Patent: Aug. 8, 2023

(54) REDUCING MULTICAST JOIN LATENCY FOR IPTV STREAMS

(71) Applicant: Hewlett Packard Enterprise Development LP, Houston, TX (US)

(72) Inventors: Tathagata Nandy, Bangalore (IN); Chethan Chavadibagilu Radhakrishnabhat, Bangalore (IN); Priyam De, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 90 days.

(21) Appl. No.: 17/507,474

(22) Filed: Oct. 21, 2021

(65) Prior Publication Data
US 2023/0126874 A1 Apr. 27, 2023

(51) Int. Cl.
*H04N 21/238* (2011.01)
*H04N 21/25* (2011.01)
*H04N 21/438* (2011.01)

(52) U.S. Cl.
CPC ......... *H04N 21/238* (2013.01); *H04N 21/251* (2013.01); *H04N 21/4384* (2013.01)

(58) Field of Classification Search
CPC . H04N 21/238; H04N 21/251; H04N 21/4384
See application file for complete search history.

(56) References Cited

U.S. PATENT DOCUMENTS

| 2006/0075428 | A1* | 4/2006 | Farmer | H04N 21/64322 725/38 |
| 2007/0121629 | A1* | 5/2007 | Cuijpers | H04N 21/23406 370/432 |
| 2007/0217416 | A1* | 9/2007 | Okuda | H04L 45/60 370/390 |
| 2009/0165043 | A1* | 6/2009 | Ou | H04N 21/4383 725/38 |
| 2009/0187946 | A1* | 7/2009 | Yousef | H04N 21/26609 714/776 |

(Continued)

FOREIGN PATENT DOCUMENTS

JP 2007324814 A * 12/2007
JP 2008294663 A * 12/2008

(Continued)

*Primary Examiner* — Robert J Hance
(74) *Attorney, Agent, or Firm* — Park, Vaughan, Fleming & Dowler LLP

(57) ABSTRACT

One aspect of the instant application facilitates reduction of multicast group join latency. During operation, the system can receive, at a network device, a first multicast group leave packet corresponding to a first multicast group. In response to receiving a first multicast group leave packet from an IPTV client, the system can simulate a second multicast group join on behalf of the IPTV client by updating, based on a predictive model, at least an entry in a table maintained in hardware with a next likely multicast group that the IPTV client is likely to join; and sending a simulated second multicast group join packet for initiating an IPTV stream associated with the next likely multicast group. In response to receiving an actual second multicast group join packet from the IPTV client, the system can facilitate the IPTV stream to the IPTV client, thereby reducing multicast group join latency.

20 Claims, 6 Drawing Sheets

(56) References Cited

U.S. PATENT DOCUMENTS

2010/0251296 A1\* 9/2010 Kim ..................... H04N 5/50
   725/38
2011/0106915 A1\* 5/2011 Kim ..................... H04N 21/251
   709/219

FOREIGN PATENT DOCUMENTS

KR    20080081599 A  \*  9/2008
WO   WO-2006041784 A2 \*  4/2006   ......... H04N 21/4331

\* cited by examiner

REDUCING MULTICAST JOIN LATENCY FOR IPTV STREAMS

BACKGROUND

This disclosure is generally related to a field of Internet Protocol Television (IPTV) services over Internet Protocol (IP) network. In IPTV systems, digital television and other multimedia services can be delivered via IP network to set-top boxes (STBs) that can be located at a customer site. IPTV systems typically use IP multicast approach for facilitating several IPTV applications, e.g., for delivering live TV channels with each TV channel assigned to a certain multicast group. In an IP multicast approach, IPTV users may request for a specific TV channel, e.g., a sports TV channel, and the STB may "tune" to the TV channel by sending an Internet Group Management Protocol (IGMP) join request. The system may forward the request to a multimedia server which can deliver the requested video stream to one or more multicast enabled routers along the network path. The multicast enabled routers can send the video stream to multiple STBs that joined the multicast group.

BRIEF DESCRIPTION OF THE FIGURES

In the figures, like reference numerals refer to the same figure elements.

DETAILED DESCRIPTION

Figure 1:
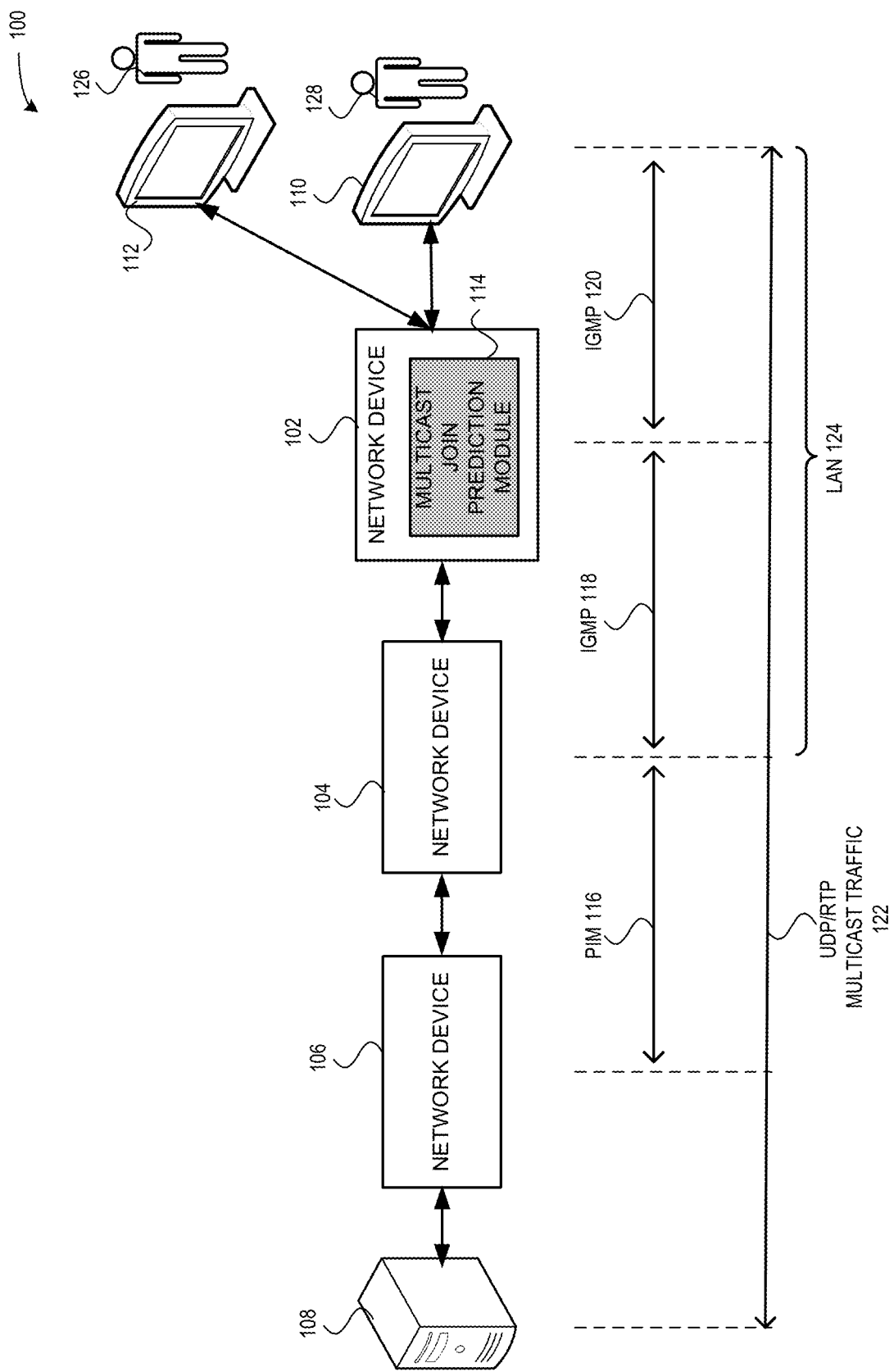
FIG. 1 illustrates an example multicast network environment including a system for performing multicast join prediction, according to one aspect of the instant application.

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

Current IPTV systems can provide a large number of IPTV channels, e.g., in the order of hundreds of TV channels, for viewing by an IPTV user. With the availability of such a large number of IPTV channels, there is an increase in likelihood of IPTV users frequently switching between different IPTV channels. Each time an IPTV user switches from a current viewing multicast TV channel to a new multicast TV channel, the STB may first send an IGMP leave message to indicate that the IPTV user has left the current viewing multicast TV channel. Further, IGMP leave message may also indicate a request to discontinue streaming of the multicast TV channel. Subsequently, the STB may send an IGMP join message in response to the IPTV user selecting a new multicast TV channel or joining a new multicast group. The STB may forward the IGMP join message via multiple upstream routers in the network to a source device that can provide the video stream corresponding to the new multicast TV channel. While provisioning the video stream from the source device, the video stream can be replicated across multiple nodes in the network. Furthermore, the nodes that receive the video stream can program a number of table entries which can add some delay before forwarding the video stream to the next node in the network path between the source device and the IPTV client device (or STB). Moreover, the delays can get cumulative when multiple nodes exist along the network path. This cumulative delay can represent a multicast join latency.

Multicast join latency can be typically defined as the time at which a multicast user sends a request to join a particular multicast channel (or multicast group) and the time it takes to receive the data or the video stream. A high multicast join latency can be typically annoying and undesirable for IPTV users when they are switching between TV channels to receive video feeds. Further, a high latency can result in a poor video experience for the IPTV users.

Some of the aspects described in this application provide a technical solution to the above-mentioned technical problems by providing a system and method for reducing the multicast join latency. Specifically, the system may build a predictive model by monitoring and storing in a shadow database historical information about view durations associated with different IPTV channels the IPTV user has viewed previously. The system may store a threshold number of entries in the shadow database, e.g., four entries with highest view durations. In response to receiving a multicast group leave message for an IPTV channel the system may look-up the shadow database and retrieve the next probable multicast groups that the IPTV user is likely to join. The system may then simulate a multicast group join which can involve pre-programing an actual database with information associated with the next probable multicast groups. In response to pre-programming the actual database, the system may trigger the pre-programming of the corresponding traffic flows into Application Specific Integrated Circuit (ASIC) tables, e.g., multicast routing tables, which can enable the initiation of traffic flows or IPTV streams for the next probable multicast groups even before receiving the actual multicast group join message. When the system receives the actual multicast group join message from the STB for the next multicast group, the system may readily provide the video stream. This is because the traffic flow for the video stream associated with the next multicast group has already been initiated based on the simulated multicast group join, thereby alleviating or reducing the multicast join latency.

The term "multicast group" refers to a multicast IPTV channel that an IPTV client can join.

The terms "IPTV stream", "multicast stream" or "stream" refers to video or audio data that can flow from a multicast server to an IPTV client device via a network including one or more network devices.

The term "group member" refers to an IPTV client that has joined a specific multicast group.

The terms "IPTV channel" and "TV channel" are used interchangeably in this application.

System Architecture for Facilitating Reduction of Multicast Group Join Latency

FIG. 1 illustrates an example multicast network environment including a system for performing multicast join prediction, according to one aspect of the instant application. In the example shown in FIG. 1, environment 100 shows a set of network devices or network appliances, e.g., network devices 102-106. Network device 102 can represent a layer-2, i.e., the second layer in the seven-layer Open Systems Interconnection (OSI) model in computer networking, network switch included in an access layer of network environment 100. Network devices 104 and 106 can represent layer-3 network devices. Typically, network device 102 or switch can be coupled to multiple IPTV client devices, e.g., 110 and 112. Further, a typical network 100 can include multiple access layer switches with each switch coupled to multiple IPTV client devices (or STBs). These multiple switches can be grouped into different virtual local area networks (VLANs). For simplicity, environment 100 shows one network switch 102 that is coupled to IPTV client devices 112 and 110.

During operation, when an IPTV user 128 switches between TV channels, IPTV client device 110, e.g., a STB device, may send a multicast group leave message for the previous TV channel and send a multicast group join message for the new TV channel or a new multicast group. In response to network device 102 receiving the multicast group join message from IPTV client device 110, network device 102 may forward this multicast group join message to a source device 108 via multiple upstream network devices, e.g., 104 and 106.

IGMP or Multicast Listen Discovery (MLD) protocols can correspond to first hop router protocols that can be used by a host or IPTV client device 110 to manage membership to a multicast group and to request multicast traffic. IGMP can be used in Internet Protocol version 6 (IPv6) and IGMP in IPv4. One aspect of this application can support both IGMP and MLD. Network device 102 may forward IGMP/MLD multicast group joins to upstream routers, e.g., network devices 104 and 106. The network traffic forwarding rules at each of the upstream routers are governed by their respective Request for Comments (RFCs) corresponding to the Internet Engineering Task Force (IETF). In an IP network, data traffic may take long time, e.g., even up to approximately 10 seconds, to start flowing while multiple multicast IPTV users are zapping or switching between channels at about the same time. For example, IPTV user 126 may switch from a sports TV channel to a movie TV channel, while IPTV user 128 may switch from a news TV channel to a music TV channel.

In one example, network devices in the access layer, e.g., network device 102, can have IGMP/MLD snooping enabled. In other examples, IGMP/MLD can be enabled in network devices residing in the core layer of network environment 100. Enabling IGMP/MLD snooping for a corresponding VLAN or LAN 124 can optimize the multicast traffic flow and can ensure that the traffic flow is restricted within a segment where there are IGMP/MLD clients. Such a configuration can result in an effective utilization of available network bandwidth. In other words, without enabling IGMP/MLD snooping, source device 108 (or a multicast source) may simply broadcast the requested video stream to multiple network devices (with each network device coupled to multiple IPTV clients) even if one or more of the IPTV clients coupled to the network devices have not requested the video stream. Therefore, enabling an IGMP/MLD snooping feature in network devices coupled to the IPTV clients can optimize the traffic flow and can hence result in an effective utilization of available network bandwidth.

IPTV client device, e.g., 110 or 112, may apply an IGMP/MLD protocol 120 to provide group membership information. When IGMP/MLD snooping is enabled, network device 102 can maintain and track an IGMP/MLD table which can include information about a given VLAN, a given TV channel, and the port numbers on which to forward the video stream. Network device 102 may apply IGMP/MLD protocol 118 to forward the received multicast group joins to a multicast router or network device 104. Network device 104 may then apply Protocol Independent Multicast (PIM) protocol 116 to forward the multicast group join as a PIM join via ports where PIM routers, i.e., network device 106, are located and additionally to ports configured as forward ports administratively.

IGMP Querier (or PIM Router 106) device may learn or receive the multicast group joins to retrieve the data from source device 108 and forward the data traffic towards the joined ports. In a scaled scenario, there could be multiple IPTV multicast clients zapping channels at approximately the same time which would generate a large number of IGMP/MLD leave packets followed by join packets at about the same time. In such a case, Querier switch 106 would take some time to process the leave and then join packets and program the hardware to forward the data traffic for the new join received. A typical network can include a large number of interconnected intermediate network devices between source 108 and IPTV client device, e.g., 110. From the instant a multicast group join is sent and the instant when IPTV client device receives the video stream, multiple entries have to be programmed in forwarding tables at different intermediate network devices to enable the flow of multicast traffic 122 (based on Real-Time Transport Protocol (RTP) or User Datagram Protocol (UDP)) for the new multicast group. Each intermediate network device in a multicast tree, i.e., including multicast routing path from the source to a group of IPTV client devices, can take a certain amount of time to program its table and this time at each intermediate network device can add up to result in a cumulative delay. This cumulative delay can interfere with the IPTV user's video viewing experience.

Specifically, each time an IPTV user switches from a current viewing multicast TV channel to a new multicast TV channel, the STB or IPTV client device, i.e., 110 or 112, may first send an IGMP leave message (or packet) to indicate that the IPTV user has left the current viewing multicast TV channel. Further, IGMP leave message may also indicate a request to discontinue streaming of the multicast TV channel the IPTV user left. Subsequently, the STB may send an IGMP join message in response to the IPTV user selecting a new multicast TV channel. In response to receiving the IGMP join message from the STB, network device 102 may forward the IGMP join message via multiple upstream routers in the network to a source device that can provide the video stream corresponding to the new multicast TV channel. While provisioning the video stream from source device 108, the video stream can be replicated across multiple nodes, e.g., 106 and 104, in the network.

Furthermore, in response to network device 106 receiving the video stream from source device 108, network device 106 can program a number of table entries which can add some delay. After network device 106 has programmed the table entries, it can forward the video stream to the next node, i.e., network device 104, in the network path between source device 108 and IPTV client device, e.g., 110. Specifically, in response to receiving a request for a new video stream, there can be multiple network devices in the network where entries have to be programmed in hardware-maintained tables. Programming the table entries in each network switch or router may increase the latency incurred at each network device and can hence add to the total delay in providing the requested video stream to an IPTV user. For example, a delay added at network device 104 to forward the video stream to IPTV client device 110 can be a sum of the delay at network device 106 and the delay at network device 104. Therefore, with multiple nodes along the network path can result in a cumulative delay that can correspond to a multicast join latency. A high multicast join latency can be typically annoying or undesirable for IPTV users when they are switching TV channels to receive video feeds. A high latency can result in a poor video experience for the IPTV users. In a typical network environment, there can be a large number of multicast group joins, e.g., in the order of thousands of joins, which can further result in a significant increase in the join latency.

Some of the aspects described in this application can overcome the above-mentioned problems by providing a novel approach to reduce or alleviate the multicast join latency for minimizing the disruption in service to the IPTV user and providing an enhanced user viewing experience. Specifically, network device in the access layer, e.g., network device 102, can implement a multicast join prediction module 114 to analyze the previously viewed IPTV channels that IPTV user has viewed to build a predictive model.

During operation, when IPTV user, e.g., user 128, desires to switch to another TV channel the IPTV user may first leave the current viewing TV channel. IPTV client device 110 may translate this leave operation to a multicast group leave message and send it to network device 102 which includes the system implementing multicast join prediction module 114. Based on the predictive model, the system can simulate a multicast group join for a next likely multicast group the IPTV user might view. The system may then pre-program the next likely multicast group in the ASIC table and may forward the simulated multicast group join packet to a local multicast router 104 which would forward it as PIM join 116 towards PIM router 106. PIM router 106 may retrieve a video stream corresponding to the simulated multicast group join. In other words, the data traffic for the likely multicast group that IPTV user may join starts flowing even before network device 102 receives the actual multicast group join request.

Next when IPTV user 128 switches to a new TV channel, i.e., joins a new multicast group, that corresponds to the next likely multicast group, the system may readily provide the video stream to IPTV user 128, thereby optimizing the IGMP/MLD join latency time during IPTV channel zapping, i.e., switching between TV channels and enhancing the user experience. Multicast join prediction module 114 is described below in reference to FIGS. 2-5.

Figure 2:
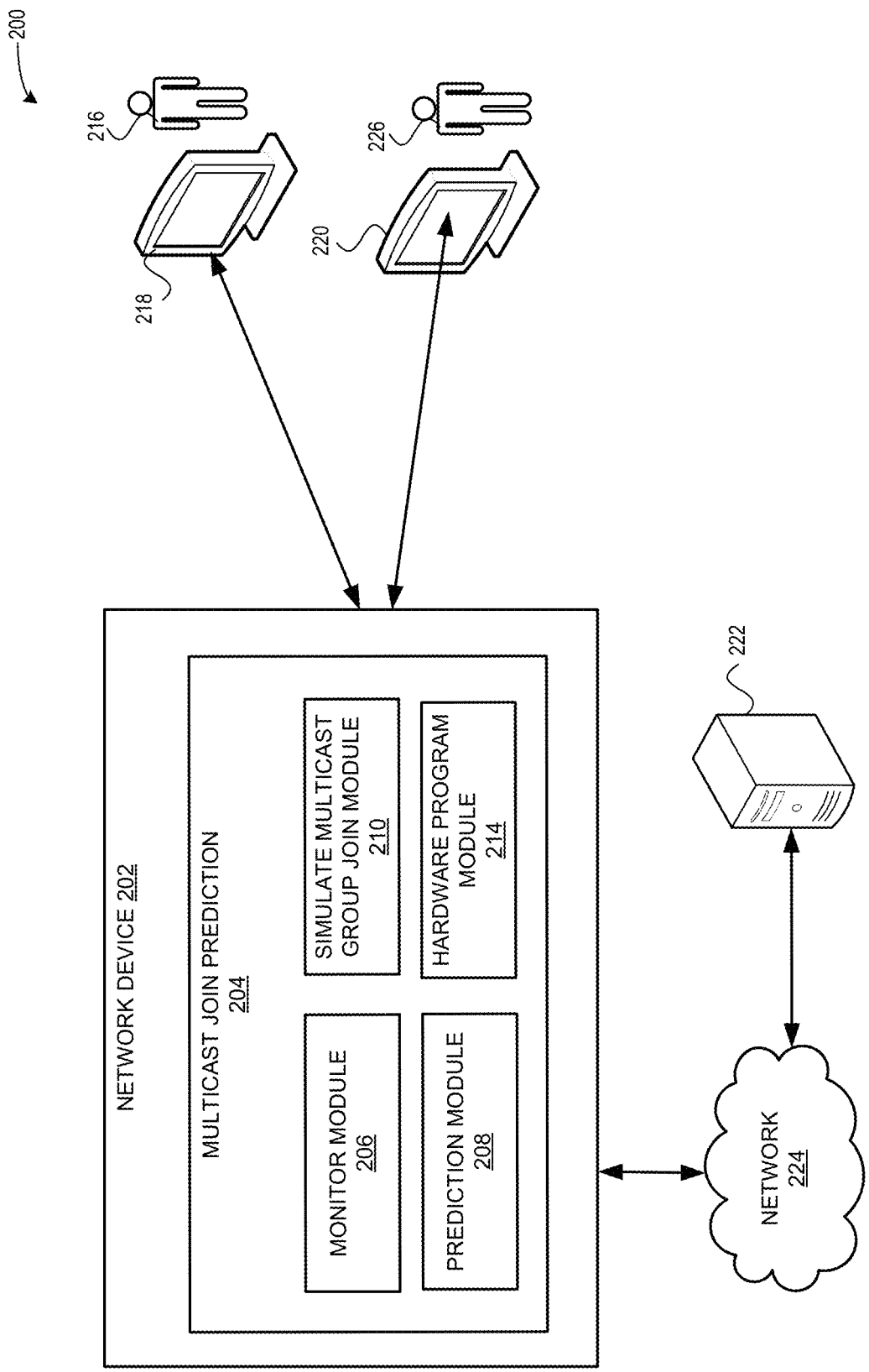
FIG. 2 illustrates an example system architecture for facilitating reduction of multicast join latency, according to one aspect of the instant application.

FIG. 2 illustrates an example system architecture for facilitating reduction of multicast join latency, according to one aspect of the instant application. In the example shown in FIG. 2, system architecture 200 for a network device 202 in an access layer of a computer network can include a multicast join prediction system 204. Network device 202 can be coupled to one or more IPTV client devices, i.e., 218 and 220. Network device 202 can be coupled to a source or a video server 222 via multiple upstream network devices residing in network 224.

Network device 202 can include a system for implementing multicast join prediction 204 to facilitate reduction of multicast join latency. Specifically, the system implementing multicast join prediction 204 can include a monitor module 206 to monitor or track on a per interface (or per VLAN) and on a per network device port basis view durations corresponding to different multicast groups, i.e., TV channels. Each group or TV channel can be associated with a timer indicating how long an IPTV user has been watching the TV channel or how long the TV channel was active. In other words, monitor module 206 can track a time when a multicast group join message or packet was received, i.e., a time when the IPTV user joined or switched to the TV channel, and for how long the IPTV user has been watching the TV channel. Monitor module 206 may collect this view duration information for a certain monitoring period. For example, monitor module 204 may track and store on a per interface and per port basis a time $T_1$ at which a new IGMP or MLD multicast group join is received. In response to receiving a multicast group leave packet for the currently viewed IGMP or MLD multicast group, monitor module 204 may determine a current time $T_2$ at which the multicast group leave packet was received. Monitor module 204 may compute a view duration for which the multicast group was active by determining a time difference: $T_{view\_duration} = T_2 - T_1$.

Prediction module 206 may determine whether the view duration, $T_{view\_duration}$, corresponding to the multicast group is higher than a current known view duration value previously stored in a shadow database for the same multicast group or for a different multicast group corresponding to the VLAN and port. The shadow database can represent a predictive model that the system can apply to simulate a multicast group join. In response to determining that $T_{view\_duration}$ is higher than the current known value in the shadow database, prediction module 206 may update the VLAN, port, and multicast group related information in the shadow database. Prediction module 206 may store a threshold number of top multicast groups for each VLAN and port based on their corresponding view durations, e.g., top four multicast groups with highest view durations. Prediction module 206 may apply the view duration as a key to track the highest viewing channels. For example, if over a certain time period IPTV user 226 has viewed and switched between ten different TV channels, prediction module 206 may selected at least four TV channels with longest view duration and store information about these four TV channels in the shadow database. Based on this history information stored in the shadow database, prediction module 206 can predict that the four TV channels can be the next likely TV channels IPTV user 226 may switch to after leaving a current viewing TV channel.

In one aspect, prediction module 206 may store the selected multicast group information in a shadow database with the following fields: {VLAN, PORT, GROUPS {{KEY: GROUP IP}: {VALUE: VIEW DURATION}}. The field VLAN indicates an identifier for a VLAN in which the IPTV client device is located; the field PORT indicates a port number to which the IPTV client device is coupled; the field GROUPS indicates a list of selected probable multicast groups that the IPTV user associated with the IPTV client device is likely to join, the GROUPS field may also include a view duration for the corresponding multicast group. In other words, shadow database may store the next probable joins on a given port in a VLAN in the above-mentioned format.

Prediction module 206 may predict a next probable or likely multicast group join for a specific IPTV client device under consideration, i.e., for a certain VLAN or interface and a port, based on the view duration information collected by monitor module 204. In one aspect, prediction module 206 may determine a certain number of multicast groups associated with an IPTV client device under consideration with large view durations. For example, prediction module 206 may select the top four multicast groups on a per interface and per port basis. Prediction module 206 may store the selected multicast groups in a local cache maintained by the system implementing multicast join prediction 202. The local cache can be the shadow database which can represent a statistical model that prediction module 206 can build for predicting a next probable join the IPTV user may likely join. The shadow database can maintain a history of how long an IPTV channel was active for a given IPTV user, given VLAN, and a given port. The system may apply the shadow database as a predictive model for programming network device 202 hardware, e.g., ASIC tables.

In one example, the system may have IGMP enabled and can be a Querier. The Querier may periodically poll IPTV client devices by sending General Query Messages (GQMs) to check whether the IPTV clients still belong to a certain multicast group, i.e., to check group membership. Specifically, the Querier may periodically send a host query to fetch group membership reports from active IPTV clients. Based on the received group membership reports the system may refresh the existing timers and may apply monitor module 204 to compute view durations corresponding to the current active TV channels. The system may then apply prediction module 206 to update the shadow database periodically in response to the periodic host queries. In another aspect, the system may apply prediction module 206 to update the shadow database in response to receiving a multicast group leave and a multicast group join packet.

The system may also send the host query in response to a multicast group leave packet. For example, when user 216 switches between channels, IPTV client device 218 may send a multicast group leave packet. The system in response to receiving the multicast group leave packet may send a multicast group specific query to other IPTV clients, e.g., IPTV client 220, to ensure that IPTV user 226 is not watching the channel or which IPTV client device 218 sent a multicast group leave packet. When no other IPTV users are watching the channel or joined the multicast group the system may remove the multicast group related information from ASIC table to discontinue receiving traffic associated with the multicast group.

Often an IPTV user, e.g., user 226, may switch between channels for viewing different TV channels. In response to IPTV user 226 leaving a current viewing multicast group or TV channel and joining another multicast group, IPTV client device 220 may first send a multicast group leave packet to network device 202. The system may in response to receiving the multicast group leave packet associated with a certain VLAN and a port, may apply a simulate multicast group join module 210 to look-up the shadow database to identify a probable multicast group that IPTV user 226 is likely to join. Simulate multicast group join module 210 may then simulate a multicast group join packet for the identified next probable group and may trigger the pre-programming of an actual database by replicating entries in shadow database to the actual database.

In one aspect, simulate multicast group join module 210 may identify multiple probable multicast group joins from the shadow database and pre-program the actual database with information associated with the multiple probable multicast groups. In response to simulate multicast group join module 210 pre-programming the actual database, the system may apply a hardware program module 214 to pre-program one or more ASIC tables corresponding to the next probable multicast groups in the actual database. With the pre-programming of the ASIC tables the system may subsequently initiate the traffic flows for the next probable multicast groups that IPTV user 226 is likely to join or view.

Next, when the system receives a multicast group join packet corresponding to a new multicast group that IPTV user 226 has selected for viewing and if the new multicast group matches one of the probable multicast groups pre-programmed in the ASIC tables, the traffic flow would be available to IPTV client device 220 without delay or with insignificant delay. Therefore, the system can facilitate the reduction of multicast group join latency by performing predictive hardware programming even before receiving the actual multicast group join from IPTV client device 220.

In one aspect, when another IPTV user, e.g., 216, sends a multicast group leave packet, the system may determine that the next likely multicast group that IPTV user 216 may view is already programmed in the ASIC table. In such a case, the system may bypass the initiation of the traffic flow associated with the next likely multicast group. When the system receives the actual second multicast group request from IPTV client 218, the system may facilitate the IPTV stream associated with the second multicast group to IPTV client 218, thereby providing an enhanced user experience to users associated with IPTV client devices in a certain VLAN.

In another aspect of this application, the system may include a timer to timeout the entries pre-programed in the ASIC tables. For example, when one or more pre-programmed entries in the ASIC tables have not been used for a certain amount of time, these entries would be timed out and removed. In other words, the system may remove these timed out entries from the ASIC tables so that traffic flow for unused or not requested multicast groups can be discontinued, thereby saving the network bandwidth utilization. Further, with the removal of pre-programmed entries in the ASIC tables, the system may also delete corresponding entries in the actual database and the shadow database.

Figure 3A:
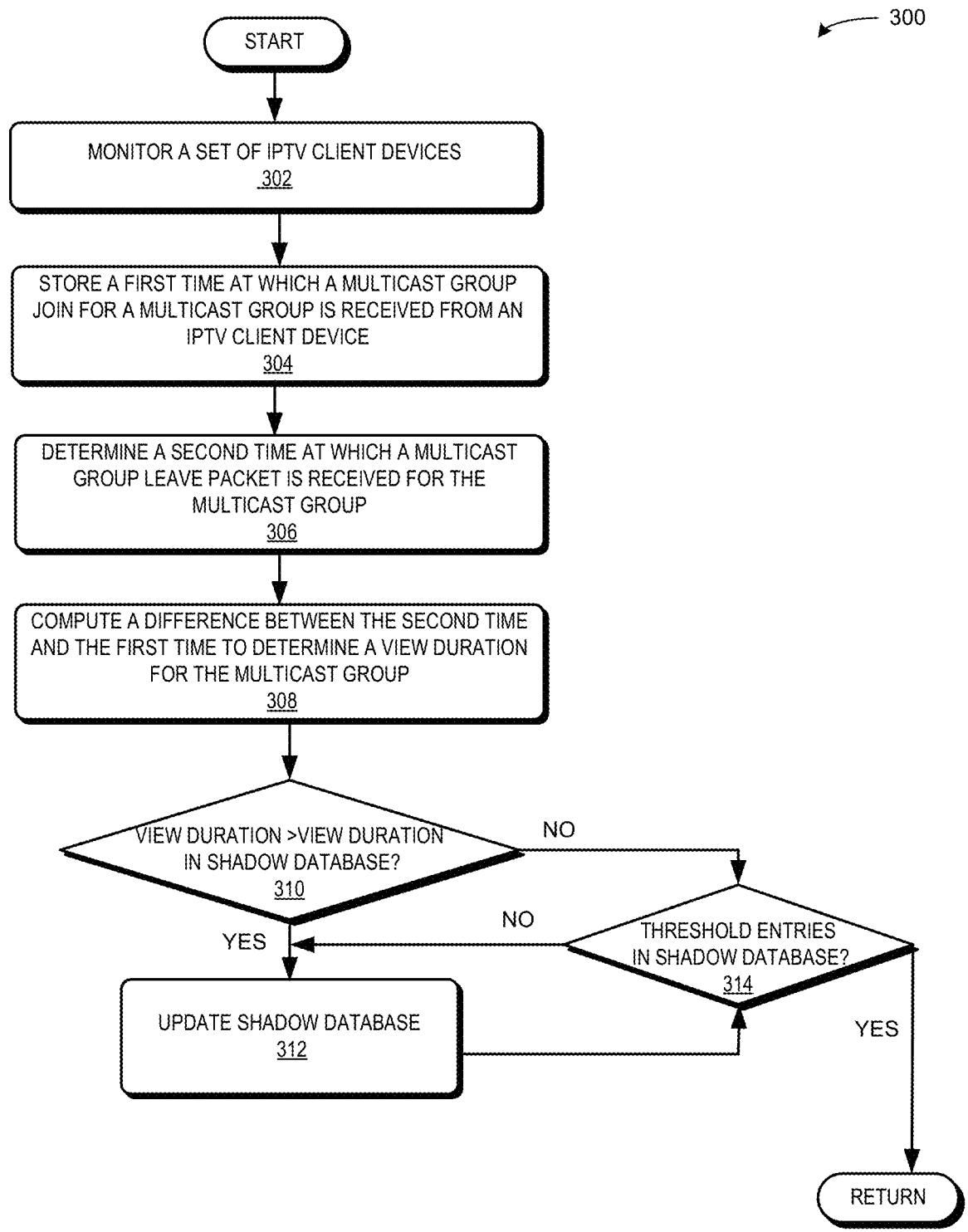
FIG. 3A presents a flowchart illustrating an example process for creating a predictive model, according to one aspect of the instant application.

FIG. 3A presents a flowchart illustrating an example process for creating a predictive model, according to one aspect of the instant application. Referring to flowchart 300 in FIG. 3A, during operation, the system can monitor a set of IPTV client devices that are coupled to the system to track multicast group join and leave packets (operation 302). When an IPTV user switches from the between two multicast groups, the IPTV device may translate this switch operation first to a multicast group leave packet corresponding to a previous multicast group. Then the system may translate this switch operation to a multicast group join packet corresponding to the IPTV user joining a first multicast group. In response to receiving a multicast group join packet for the new multicast group, the system may identify and store a first time, $T_1$, at which this multicast group join packet is received from an IPTV client device (operation 304). In response to the system receiving the multicast group leave packet corresponding to the first multicast group, the system may identify and store a second time, $T_2$, at which the multicast group leave packet was received (operation 306).

The system may then determine how long the IPTV user was viewing the first multicast group before switching to another multicast group by computing the time difference: $T_{view\_duration} = T_2 - T_1$ (operation 308). The system may determine whether this view duration, $T_{view\_duration}$, associated with the first multicast group is greater than another view duration that the system had previously stored in a shadow database (operation 310), e.g., view duration associated with the first multicast group or another multicast group the IPTV user had previously viewed. When the condition in operation 310 is satisfied, i.e., first multicast group view duration is higher than a current known value for the first multicast group in the shadow database or higher than current known values for other multicast groups, the system may update the associated VLAN, PORT, and GROUP fields in the shadow database (operation 312).

The system may store a threshold number of entries in the shadow database corresponding to each VLAN and PORT, e.g., the system may store four top view durations on a per interface and per port basis. These four top view durations may indicate that the corresponding multicast groups can represent the next likely multicast groups that the IPTV user is likely to join after leaving a current viewing channel or multicast group. The system may determine whether the shadow database includes the threshold number of entries (operation 314). When the condition in operation 314 is satisfied the operation returns. When the condition in operation 310 is not satisfied, i.e., the computed view duration is less than the existing values in the shadow database, and the shadow database already includes the threshold number of entries (operation 314), the shadow database may not be updated, and operation returns. When the condition in operation 310 is not satisfied, i.e., the computed view duration is less than the existing values in the shadow database, and the number of entries in the shadow database is less than the threshold number of entries (operation 314), the system may update the shadow database with the computed view duration. Therefore, the system can create a predictive model, i.e., the shadow database, according to the example process shown in FIG. 3A, and may apply the created predictive model for predicting the next probable multicast group joins even before the system can receive the actual multicast group join.

Figure 3B:
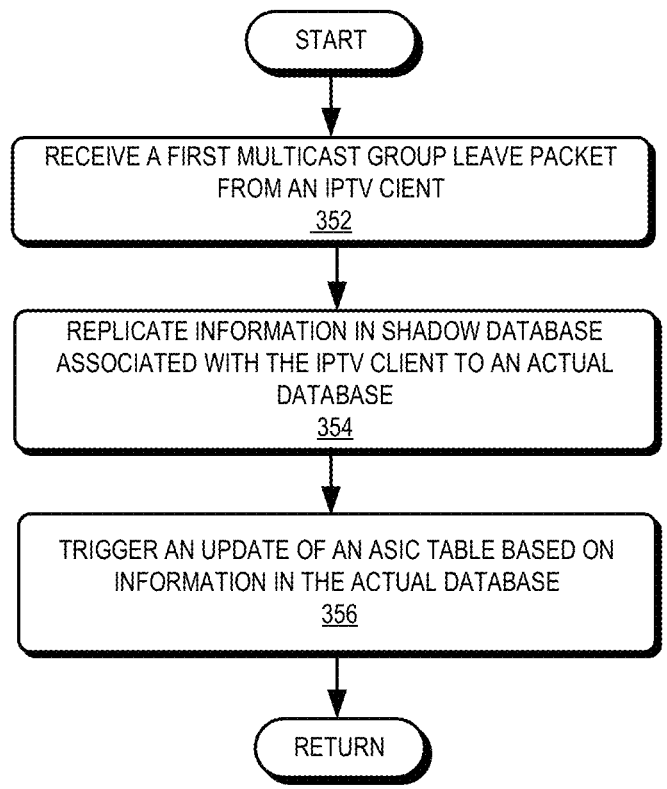
FIG. 3B presents a flowchart illustrating an example process for updating a table maintained in a network device hardware, according to one aspect of the instant application.

FIG. 3B presents a flowchart illustrating an example process for updating a table maintained in a network device hardware, according to one aspect of the instant application. A network device, e.g., a network switch, in an access layer of a network can be coupled to multiple IPTV client devices. The network device may include an ASIC table, e.g., multicast routing table, including information about which multicast groups are to be fetched from a multicast source. An IPTV user may often switch between TV channels, e.g., from a first multicast group to a second multicast group; channel zapping may result in the IPTV client device associated with the IPTV user to send a request to discontinue receiving the first multicast group's stream. In other words, the IPTV client device may send a multicast group leave message or packet for the first multicast group to the network device. The system implementing a multicast join prediction in the network device can receive this first multicast group leave packet (operation 352). In response to receiving the first multicast group leave packet, the system may look-up a shadow database to identify the next likely multicast groups the IPTV user is likely to join. The system may replicate the identified next likely multicast groups from the shadow database to an actual database, thereby simulating one or more multicast group joins (operation 354). The shadow database can represent a predictive model that the system can apply to simulate a multicast group join. In the absence of such a predictive model the system may wait to first receive a multicast group join packet before updating the actual database. With the predictive model, the system can simulate the multicast group join packet and update the actual database even before receiving the actual multicast group join packet.

In response to the system updating the actual database, the system may trigger, based the information in the updated actual database, an update of an ASIC table maintained in the network device ASIC (operation 356) and the operation returns.

Figure 4:
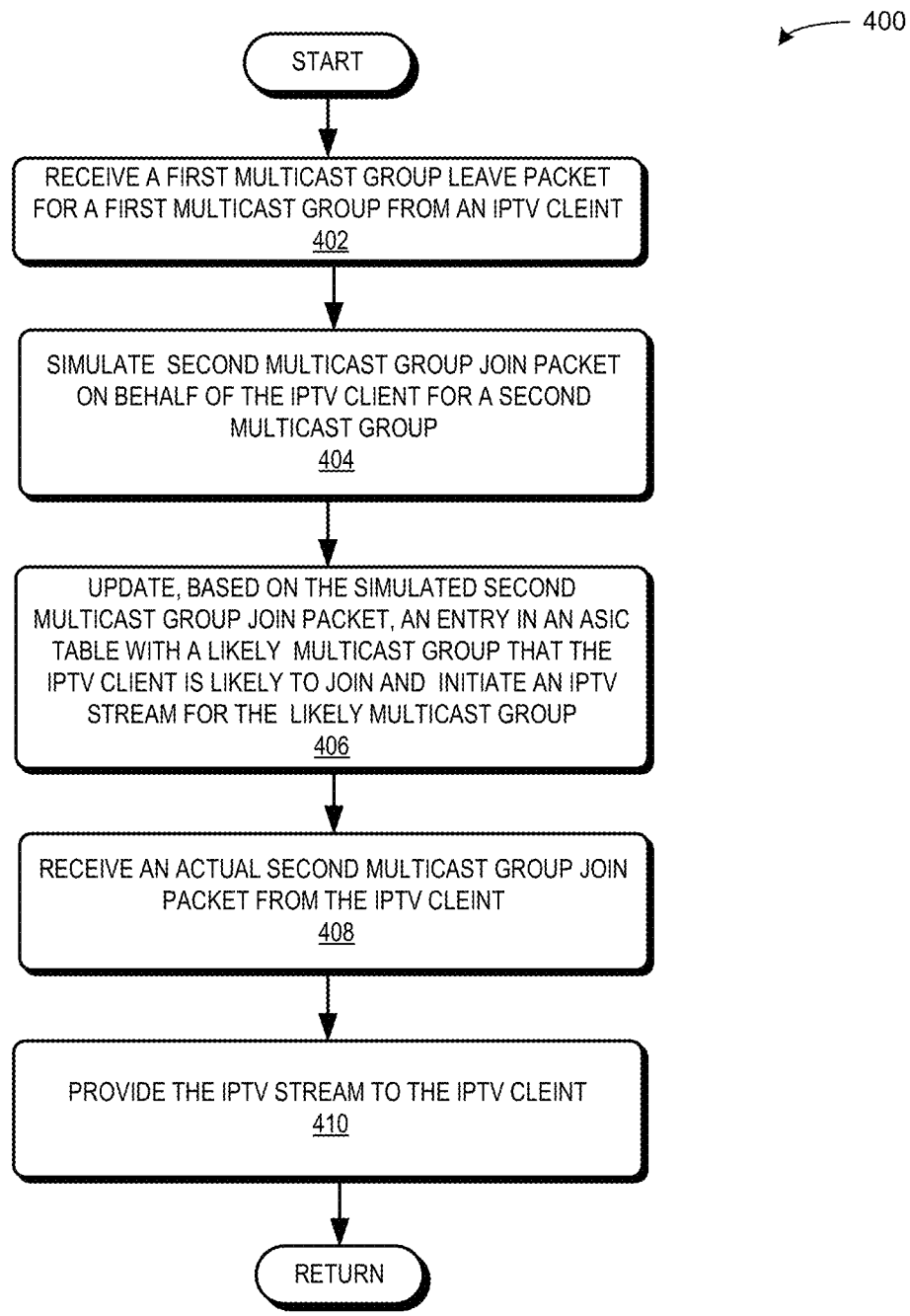
FIG. 4 presents a flowchart illustrating an example process for reducing multicast join latency for IPTV streams, according to one aspect of the instant application.

FIG. 4 presents a flowchart illustrating an example process for reducing multicast join latency for IPTV streams, according to one aspect of the instant application. Referring to flowchart 400 in FIG. 4, during operation the system may receive a first multicast group leave packet for a first multicast group from an IPTV client device (operation 402). In response to receiving the first multicast group join packet, the system may look-up a shadow database (which represents a predictive model) to identify one or more probable multicast groups that the IPTV user is likely to join after leaving the first multicast group. The system may simulate one or more multicast group joins corresponding to the identified one or more likely multicast groups on behalf of the IPTV client device, by copying the information corresponding to the identified one or more likely multicast groups to an actual database (operations 404). In other words, the system may first update the actual database with information corresponding to the identified one or more likely multicast groups. The system may then replicate these updates from the actual database to an ASIC table and can initiate traffic flows or IPTV streams corresponding to these multicast groups that the IPTV client may likely view after leaving the first multicast group (operation 406). Therefore, even before the system receives a second multicast group join packet, the system would have already initiated traffic flows corresponding to the one or more likely multicast groups that the IPTV user is likely view next.

When the system receives an actual second multicast group join packet (operation 408), the system may readily provide the IPTV stream associated with the second multicast group (operation 410). Since the system has already initiated the traffic flows for the likely multicast groups the IPTV user may join, i.e., the second multicast group can be included in the likely multicast groups, the system can provide the IPTV stream for the second multicast group without delay, thereby reducing the multicast group join latency.

Computer System for Facilitating Reduction of Multicast Group Join Latency

Figure 5:
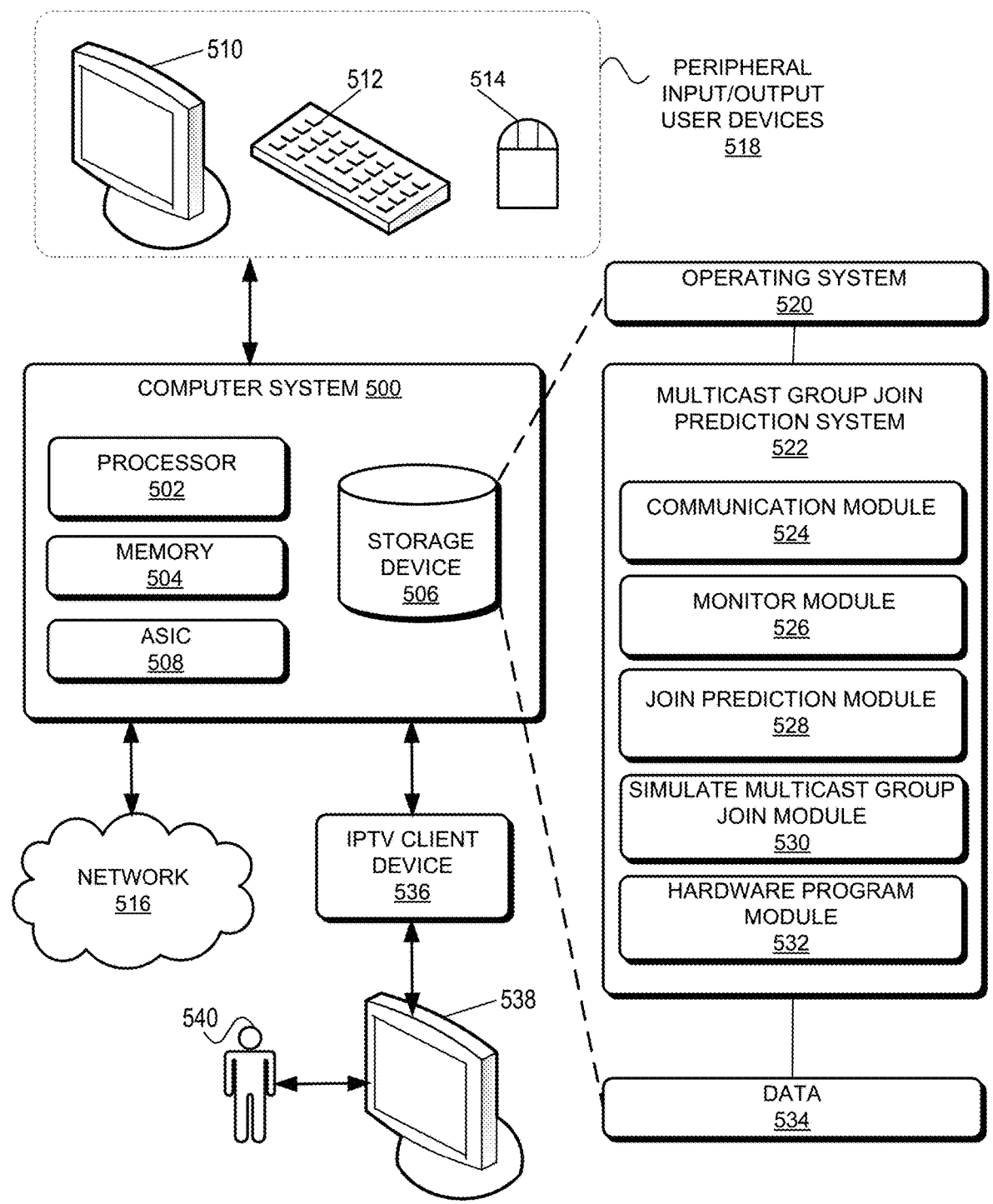
FIG. 5 illustrates an example computer system that facilitates reduction of multicast join latency for IPTV streams, according to one aspect of the instant application.

FIG. 5 illustrates an example computer system that facilitates reduction of multicast join latency for IPTV streams, according to one aspect of the instant application. In this example, computer system 500 can include a processor 502, a memory 504, a storage device 506, and an ASIC 508 which can include one or more ASIC tables. Computer system 500 can be coupled to peripheral input/output (I/O) user devices 518, e.g., a display device 510, a keyboard 512, and a pointing device 514. Storage device 506 can store instructions for an operating system 520, a multicast group join prediction system 522, and data 534. Data 534 can include any data that is desirable as input or that is generated as output by the methods and/or processes described in this disclosure. Computer system 500 can be coupled via one or more network interfaces to a network 516 via which computer system 500 can obtain IPTV streams for an IPTV user 540. Further, computer system 500 can be coupled via one or more network interfaces to one or more IPTV client devices, e.g., IPTV client device 536 (or a STB) to send IPTV streams to a user device 538, e.g., a TV, for viewing by user 540.

In one aspect of this application, multicast group join prediction system 522 can include instructions, which when executed by processor 502 can cause computer system 500 to perform methods and/or processes described in this disclosure. Multicast group join prediction system 522 can include a communication module 524 for sending IGMP/MLD packets to other nodes in network 516 via one or more network interfaces. Communication module 524 can also receive/obtain messages, e.g., multicast group leave and/or join messages, from IPTV client device 536; and data packets from a multicast source via other network nodes in network 516 via one or more network interfaces. Multicast group join prediction system 522 can further include instructions for implementing a monitor module 526 to monitor or track on a per interface (or per VLAN) and on a per network device port basis, view durations corresponding to different multicast groups, i.e., TV channels. Monitor module 526 may collect and store this view duration information in memory 504.

Multicast group join prediction system 522 can include a join prediction module 528 to determine whether a view duration corresponding to the multicast group is higher than a current known view duration value previously stored in a shadow database for the same multicast group or for a different multicast group corresponding to the VLAN and port. In response to determining that the view duration is higher than the current known value in the shadow database, join prediction module 528 may update the shadow database. Join prediction module 528 may store a threshold number of top multicast groups for each VLAN and port based on their corresponding view durations, e.g., four multicast groups with highest view duration.

Join prediction module 528 may predict a next probable or likely multicast group join for a specific IPTV client device under consideration, i.e., for a certain VLAN or interface and a port, based on the viewing information collected by monitor module 526. For example, join prediction module 528 may select the top four multicast groups on a per interface and per port basis and store the selected multicast groups in a local cache, e.g., in memory 504, along with the running timer details. The local cache can be the shadow database which can represent a statistical model that join prediction module 528 builds for predicting a next probable join the IPTV user may likely join.

The multicast group join prediction module 522 can include a simulate multicast group join module 530 to look-up the shadow database to identify one or more probable multicast groups that IPTV user 540 is likely to view next. Simulate multicast group join module 530 may simulate multicast group joins for the identified next probable multicast groups and may trigger the pre-programming of an actual database by replicating entries for the identified next probable groups from the shadow database to the actual database. In other words, simulate multicast group join module 530 can pre-program the actual database even before multicast group join prediction system 522 receives the actual multicast group join packet.

In response to simulate multicast group join module 530 pre-programming the actual database, multicast group join prediction system 522 may apply a hardware program module 532 to pre-program one or more ASIC tables in ASIC 508 corresponding to the next probable multicast group joins in the actual database. With the pre-programming of the ASIC tables multicast group join prediction system 522 may subsequently initiate traffic flows for the next probable multicast groups that IPTV user 540 is likely to join or view. In other words, hardware program module 532 can perform predictive hardware programming based on the information in the actual database even before multicast group join prediction system 522 receives the actual multicast group join packet from IPTV client device 536. Therefore, multicast group join prediction system 522 can optimize the multicast group join latency time in a computer network and hence can improve the customers video viewing experience.

Next, communication module 524 can receive an actual multicast group join packet corresponding to a new multicast group that IPTV user 540 has selected for viewing. When multicast group join prediction system 522 determines that the new multicast group matches one of the probable multicast group joins pre-programmed in the ASIC tables, the traffic flow would be available to IPTV user 540 via IPTV client device 536 without delay. Therefore, the system can facilitate the reduction of multicast group join latency and minimize the disruption of service to the user by performing predictive hardware programming.

One aspect described in this application can provide a system and method for reducing multicast group join latency. During operation, the system can receive, at a network device, a first multicast group leave packet. A first multicast group corresponds to a first Internet Protocol Television (IPTV) channel previously that is currently active. The first multicast group leave packet indicates a request to discontinue receiving multicast network traffic associated with the first multicast group. In response to receiving a first multicast group leave packet from an IPTV client, the system can simulate a second multicast group join on behalf of the IPTV client by updating, based on a predictive model, at least an entry in a table maintained in hardware with a next likely multicast group that the IPTV client is likely to join; and sending a simulated second multicast group join packet for initiating an IPTV stream associated with the next likely multicast group. In response to receiving an actual second multicast group join packet from the IPTV client, the system can then facilitate an IPTV stream associated with the second multicast group to the IPTV client, thereby reducing multicast group join latency.

In a variation on this aspect, the system can create the predictive model for predicting the next likely multicast group by, monitoring, by the network device, a set of IPTV clients corresponding to a respective network device port and a virtual local area network (VLAN); determining a first time at which a multicast group join for a multicast group is received from a respective IPTV client; determining a second time at which a multicast group leave packet for the multicast group is received; computing a difference between the second time and the first time to determine a view duration for the multicast group; and storing the view duration in a first database in the network device.

In a variation on this aspect, an entry in the first database can include a VLAN identifier; a port number; a multicast group identifier; and a view duration.

In a variation on this aspect, the system can in response to determining that the view duration for the multicast group is larger than a previously stored entry in the first database for the multicast group, update the entry with the view duration. Further, the system can in response to determining that the view duration is larger than a previously stored entry in the first database for another multicast group, update the first database by inserting a new entry for the view duration. The system can then store a threshold number of entries for a given port number and VLAN identifier. The threshold number of entries corresponds to a set of multicast groups with highest view durations. The set of multicast groups represent a set of next likely multicast groups.

In a variation on this aspect, the system can determine, based on the predictive model, the next likely multicast group that the IPTV client is likely to join. The system can update a second database by replicating information associated with the next likely multicast group from a first database. The first database can represent the predictive model and the second database can represent an actual database. The system can then in response to updating the second database, trigger an update of the table with information from the second database.

In a variation on this aspect, the next likely multicast group corresponds to the second multicast group.

In a variation on this aspect, the system can in response to determining that one or more entries in the table have timed out, remove the one or more entries from the table, thereby discontinuing traffic flows for the corresponding multicast groups included the removed one or more entries.

In a variation on this aspect, the system can initiate the IPTV stream associated with the next likely multicast group by forwarding the simulated second multicast group join packet to a video server via one or more upstream network devices to initiate the IPTV stream associated with the next likely multicast group.

In a further variation, the network device implements an Internet Group Management protocol In a further variation, the network device implements a Multicast Listener Discovery protocol.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, ASIC chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of aspects have been presented for purposes of illustration and description. They are not intended to be exhaustive or to limit the scope of this disclosure to the forms disclosed. Accordingly, many modifications and variations will be apparent to practitioners skilled in the art.

What is claimed is:

1. A computer-implemented method comprising:
    receiving, at a network device, a first multicast group leave packet, wherein a first multicast group corresponds to a first Internet Protocol Television (IPTV) channel that is currently active, and wherein the first multicast group leave packet indicates a request to discontinue receiving multicast network traffic associated with the first multicast group;
    in response to receiving the first multicast group leave packet from an IPTV client, simulating a second multicast group join on behalf of the IPTV client, wherein simulating the second multicast group join comprises:
        updating, based on a predictive model, at least an entry in a table maintained in hardware with a next likely multicast group that the IPTV client is likely to join; and
        sending a simulated second multicast group join packet for initiating an IPTV stream associated with the next likely multicast group; and
    in response to receiving an actual second multicast group join packet from the IPTV client, facilitating the IPTV stream to the IPTV client, thereby reducing multicast group join latency.

2. The computer-implemented method of claim 1, further comprising:
    creating the predictive model for predicting the next likely multicast group by:
        monitoring, by the network device, a set of IPTV clients corresponding to a respective network device port and a virtual local area network (VLAN);
        determining a first time at which a multicast group join for a multicast group is received from a respective IPTV client;
        determining a second time at which a multicast group leave packet for the multicast group is received;
        computing a difference between the second time and the first time to determine a view duration for the multicast group; and
        storing the view duration in a first database in the network device.

3. The computer-implemented method of claim 2, wherein an entry in the first database includes:
    a VLAN identifier;
    a port number;
    a multicast group identifier; and
    a view duration.

4. The computer-implemented method of claim 2, further comprising:
    in response to determining that the view duration for the multicast group is larger than a previously stored entry in the first database for the multicast group, updating the entry with the view duration;
    in response to determining that the view duration is larger than a previously stored entry in the first database for another multicast group, updating the first database by inserting a new entry for the view duration; and
    storing a threshold number of entries for a given port number and VLAN identifier, wherein the threshold number of entries corresponds to a set of multicast groups with highest view durations, wherein the set of multicast groups represent a set of next likely multicast groups.

5. The computer-implemented method of claim 1, further comprising:
    determining, based on the predictive model, the next likely multicast group that the IPTV client is likely to join;
    updating a second database by replicating information associated with the next likely multicast group from a first database, wherein the first database represents the predictive model, and wherein the second database represents an actual database; and
    in response to updating the second database, triggering an update of the table with information from the second database.

6. The computer-implemented method of claim 1, wherein the next likely multicast group corresponds to the second multicast group.

7. The computer-implemented method of claim 1, further comprising:
in response to determining that one or more entries in the table have timed out, removing the one or more entries from the table, thereby discontinuing traffic flows for the corresponding multicast groups included the removed one or more entries.

8. The computer-implemented method of claim 1, wherein initiating the IPTV stream associated with the next likely multicast group involves:
forwarding the simulated second multicast group join packet to a video server via one or more upstream network devices to initiate the IPTV stream associated with the next likely multicast group.

9. The computer-implemented method of claim 1, wherein the network device implements a Multicast Listener Discovery protocol.

10. The computer-implemented method of claim 1, wherein the network device implements an Internet Group Management protocol.

11. A computer system, comprising:
a processor;
a memory coupled to the processor and storing instructions which, when executing by the processor, cause the processor to perform a method, the method comprising:
receiving, at a network device, a first multicast group leave packet, wherein a first multicast group corresponds to a first Internet Protocol Television (IPTV) channel that is currently active, and wherein the first multicast group leave packet indicates a request to discontinue receiving multicast network traffic associated with the first multicast group;
in response to receiving the first multicast group leave packet from an IPTV client, simulating a second multicast group join on behalf of the IPTV client, wherein simulating the second multicast group join comprises:
updating, based on a predictive model, at least an entry in a table maintained in hardware with a next likely multicast group that the IPTV client is likely to join; and
sending a simulated second multicast group join packet for initiating an IPTV stream associated with the next likely multicast group; and
in response to receiving an actual second multicast group join packet from the IPTV client, facilitating the IPTV stream to the IPTV client, thereby reducing multicast group join latency.

12. The computer system of claim 11, wherein the method further comprises:
creating the predictive model for predicting the next likely multicast group by:
monitoring, by the network device, a set of IPTV clients corresponding to a respective network device port and a virtual local area network (VLAN);
determining a first time at which a multicast group join for a multicast group is received from a respective IPTV client;
determining a second time at which a multicast group leave packet for the multicast group is received;
computing a difference between the second time and the first time to determine a view duration for the multicast group; and
storing the view duration in a first database in the network device.

13. The computer system of claim 12, wherein an entry in the first database includes:
a VLAN identifier;
a port number;
a multicast group identifier; and
a view duration.

14. The computer system of claim 12, wherein the method further comprises:
in response to determining that the view duration for the multicast group is larger than a previously stored entry in the first database for the multicast group, updating the entry with the view duration;
in response to determining that the view duration is larger than a previously stored entry in the first database for another multicast group, updating the first database by inserting a new entry for the view duration; and
storing a threshold number of entries for a given port number and VLAN identifier, wherein the threshold number of entries corresponds to a set of multicast groups with highest view durations, wherein the set of multicast groups represent a set of next likely multicast groups.

15. The computer system of claim 11, wherein the method further comprises:
determining, based on the predictive model, the next likely multicast group that the IPTV client is likely to join;
updating a second database by replicating information associated with the next likely multicast group from a first database, wherein the first database represents the predictive model, and wherein the second database represents an actual database; and
in response to updating the second database, triggering an update of the table with information from the second database.

16. The computer system of claim 11, wherein the next likely multicast group corresponds to the second multicast group.

17. The computer system of claim 11, wherein the method further comprising:
in response to determining that one or more entries in the table have timed out, removing the one or more entries from the table, thereby discontinuing traffic flows for the corresponding multicast groups included the removed one or more entries.

18. The computer system of claim 11, wherein initiating the IPTV stream associated with the next likely multicast group involves:
forwarding the simulated second multicast group join packet to a video server via one or more upstream network devices to initiate the IPTV stream associated with the next likely multicast group.

19. The computer system of claim 11, wherein the network device implements a Multicast Listener Discovery protocol.

20. The computer system of claim 11, wherein the network device implements an Internet Group Management protocol.

* * * * *